R. L. WILCOX.
METHOD FOR BIFURCATING BLANKS.
APPLICATION FILED JAN. 21, 1920.
1,429,990.
Patented Sept. 26, 1922.
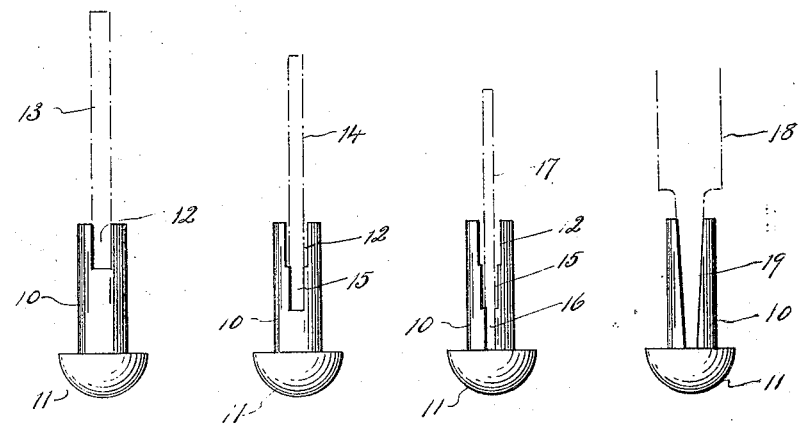

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

METHOD FOR BIFURCATING BLANKS.

Application filed January 21, 1920. Serial No. 353,121.

*To all whom it may concern:*

Be it known that I, RICHARD LESTER WILCOX, a citizen of the United States, residing at Waterbury, in the county of New Haven and State of Connecticut, have invented certain new and useful Improvements in Methods for Bifurcating Blanks, of which the following is a specification, reference being had therein to the accompanying drawings.

This invention relates to a new and improved method for bifurcating blanks, the bifurcation being accomplished by slotting the shank of the blank and when completed the slot having walls, which taper toward each other as they approach the head of the blank.

It is the object of this invention, among other things, to cut the slot in the shank of the blank with tools, that so far as possible, are of standard size and shape and readily procurable in the open market, and with the minimum number of specially prepared tools, and these so designed as to be economically constructed and capable of withstanding the maximum strain and wear.

To these and other ends my invention consists in the method for bifurcating blanks substantially as herein described and illustrated in the drawings, wherein—

Figure 1 is a view of a blank illustrating the first operation thereof;

Figure 2 is the same blank illustrating a subsequent serial operation thereon;

Figure 3 is the same blank illustrating thereon a still later operation in the series; and Figure 4 is an illustration of the completed blank.

In the drawings the blank shown has a shank 10 and a head 11, this latter being the ordinary round head, but its relative size may be very materially changed, in fact so far as my invention is concerned it is of no importance what the shape or construction of the head may be, or that it have a head.

The first step in the practice of my new and improved method consists in cutting a slot 12 of substantially uniform width in the end of the shank with a cutter of standard size and shape and make. The width of this cutter, which I have shown herein by broken lines and designated by the numeral 13, is substantially the same as the width of the finished slot at the point that is now the bottom of the slot 12. A second slot 15 of less width than the slot 12 is now made in the shank as an extension of the slot 12 by a cutter 14 of the same standard type as cutter 13, this latter slot is substantially the same width as the finished slot at point that is now the bottom of the slot 15.

Subsequently a third slot 16 extending from the slot 15 is now made by a cutter 17, its width being substantially that of the finished slot at the bottom thereof. The blank now has three slots, each having substantially parallel sides but of slightly less width as they successively approach the head 11.

While I have shown but three of these slots a greater or less number may be made but for all practical purposes three are sufficient.

The final and last cut to true up the sides of the slot is made with a cutter 18 having teeth 19 thereon of the same shape in cross section on a cutting edge as the finished slot and which is passed through the three slots substantially as shown in Figure 4 clearing therefrom the projecting portions of the walls thereof and truing up the same to complete the finished slot.

The cutters 13, 14 and 17 are of uniform size and shape while the cutter 18 is special but the teeth 19 thereon are of such size that they will withstand the maximum strain and have the minimum amount of work to do, in fact nothing more than truing up the walls of the already cut slots.

Having described my invention, what I claim as new and desire to secure by Letters Patent, is:

1. The method for bifurcating blanks which comprises slotting the blank with cuts of varying widths and then cutting the sides of said slots to form the sides of the finished slot.

2. The method for bifurcating blanks which comprises the cutting of a slot in said blank, of greater width at one end than at the other by a succession of longitudinal cuts with tools of varying widths and finally by a cut, with a tool of substantially the same shape in cross section as the finished slot.

3. The method for bifurcating blanks which comprises the cutting of a slot in said blank, of greater width at one end than at the other by a succession of longitudinal cuts with tools of varying widths, the narrowest of said cuts being substantially the same width as the narrowest part of the finished slot.

4. The method for bifurcating blanks which comprises the cutting of a slot in said blank, of greater width at one end than at the other by a succession of longitudinal cuts with tools of varying widths, the width of each of said cuts being determined by the relation of the bottom thereof with the finished slot, and then cutting the sides of said slots to form the sides of the finished slot.

In testimony whereof, I have hereunto affixed my signature.

RICHARD LESTER WILCOX.